(12) United States Patent
Chao et al.

(10) Patent No.: US 10,904,529 B2
(45) Date of Patent: Jan. 26, 2021

(54) QUANTIZATION GROUP FOR VIDEO CODING

(71) Applicant: QUALCOMM Incorporated, San Diego, CA (US)

(72) Inventors: Yung-Hsuan Chao, San Diego, CA (US); Yi-Wen Chen, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 16/250,845

(22) Filed: Jan. 17, 2019

(65) Prior Publication Data

US 2019/0230356 A1    Jul. 25, 2019

Related U.S. Application Data

(60) Provisional application No. 62/619,563, filed on Jan. 19, 2018.

(51) Int. Cl.
*H04N 19/124* (2014.01)
*H04N 19/196* (2014.01)
(Continued)

(52) U.S. Cl.
CPC ......... *H04N 19/124* (2014.11); *H04N 19/119* (2014.11); *H04N 19/157* (2014.11);
(Continued)

(58) Field of Classification Search
CPC .. H04N 19/124; H04N 19/157; H04N 19/196; H04N 19/96; H04N 19/176; H04N 19/174; H04N 19/119
(Continued)

(56) References Cited

U.S. PATENT DOCUMENTS 10,212,444 B2    2/2019   Li et al.
2013/0101031 A1  4/2013   Van Der Auwera et al.
(Continued)

FOREIGN PATENT DOCUMENTS

WO    2017203930 A1    11/2017

OTHER PUBLICATIONS

Budagavi M., et al., "Delta QP signaling at sub-LCU level," 4. JCT-VC Meeting; 95. MPEG Meeting; Jan. 20, 2011-Jan. 28, 2011; Daegu, KR (Joint Collaborative Team on Video Coding of ISO/IEC JTC1/SC29/WG11AND ITU-TSG.16 ); URL: http:wftp3.itu.int/av-arch/jctvc-site/, No. JCTVC-D038, Jan. 15, 2011 (Jan. 15, 2011), pp. 1-5, XP030008079, ISSN: 0000-0015.
(Continued)

*Primary Examiner* — Allen C Wong
(74) *Attorney, Agent, or Firm* — Qualcomm Incorporated

(57) ABSTRACT

A method of coding video data comprising determining a quantization group (QG) based on one or more of a size of a CU splitting node and a value of a region-based parameter, determining a single quantization parameter for all blocks of video data within the determined quantization group, and performing a quantization process on transform coefficients of all blocks of video data within the determined quantization group using the determined single quantization parameter.

28 Claims, 15 Drawing Sheets

(51) Int. Cl.
    H04N 19/157    (2014.01)
    H04N 19/119    (2014.01)
    H04N 19/174    (2014.01)
    H04N 19/176    (2014.01)
    H04N 19/96     (2014.01)
(52) U.S. Cl.
    CPC ......... *H04N 19/174* (2014.11); *H04N 19/176* (2014.11); *H04N 19/196* (2014.11); *H04N 19/96* (2014.11)
(58) Field of Classification Search
    USPC .................................................. 375/240.03
    See application file for complete search history.

(56) References Cited

U.S. PATENT DOCUMENTS

| | | | |
|---|---|---|---|
| 2014/0286403 A1* | 9/2014 | Nishitani | H04N 19/176 375/240.03 |
| 2017/0230663 A1* | 8/2017 | Nishitani | H04N 19/119 |
| 2017/0272782 A1 | 9/2017 | Li et al. | |

OTHER PUBLICATIONS

International Search Report and Written Opinion—PCT/US2019/014290—ISA/EPO—Mar. 14, 2019.
T-D Chuang et al: "Quantization: Sub-LCU Delta QP," 5. JCT-VC Meeting; 96. MPEG Meeting; Mar. 16, 2011-Mar. 23, 2011; Geneva, CH (Joint Collaborative Team on Video Coding of ISO/ IEC JTC1/SC29/WG11AND ITU-T SG .16) ; URL: http://wftp3.itu.int/av-arch/jc tvc-site/, No. JCTVC-E051, Mar. 7, 2011 (Mar. 7, 2011), XP030008557, ISSN: 0000-0007.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.265, "Series H: Audiovisual and Multimedia Systems, Infrastructure of audiovisual services—Coding of moving video, High efficiency video coding," The International Telecommunication Union. Dec. 2016, 664 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Lainema J., et al., "Chapter 4 Intra-Picture Prediction in HEVC, In: High Efficiency Video Coding (HEVC)," vol. 29, pp. 91-112, Aug. 1, 2014 (Aug. 1, 2014), Springer International Publishing, XP055292569, ISBN: 978-3-319-06894-7.
Bossen F., et al., "HM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 18, 2015, pp. 1-27.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band," LAN/MAN Standards Committee of the IEEE Computer Society, Dec. 28, 2012, 628 pp.
Bross B., et al., "Versatile Video Coding (Draft 1)," Joint Video Experts Team (JVET) of ITU-T SG 16 WP 3 and ISO/IEC JTC 1/SC 29/WG 11, 10th Meeting, Apr. 2018, JVET-J1001-v2, 43 pages.
Chen J., et al., "Algorithm description for Versatile Video Coding and Test Model 1 (VTM 1)," Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.
Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 pages.
An J., et al., "Block partitioning structure for next generation video coding," MPEG doc. m37524 and ITU-T SG16 Doc. COM16-C966-E, Oct. 2015, pp. 1-7.
Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.
Wang Y-K., et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Cormen T.H., et al., "Introduction to Algorithms," Second Edition, The MIT Press, McGraw-Hill Book Company, Jul. 2001, 1203 pages.
Ergen S., "ZigBee/IEEE 802.15.4 Summary," Sep. 10, 2004, 37 pp.

\* cited by examiner

QUANTIZATION GROUP FOR VIDEO CODING

This application claims the benefit of U.S. Provisional Patent Application No. 62/619,563, filed Jan. 19, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video encoding and decoding, including techniques for determining quantization groups for pictures of video data that are partitioned using multiple different partition types. This disclosure also describes techniques for quantization parameter prediction.

In one example, a method of coding video data includes determining a quantization group (QG) based on one or more of a size of a CU splitting node and a value of a region-based parameter, determining a single quantization parameter for all blocks of video data within the determined quantization group, and performing a quantization process on transform coefficients of all blocks of video data within the determined quantization group using the determined single quantization parameter.

In another example, an apparatus configured to code video data includes a memory configured to store the video data, and one or more processors in communication with the memory, the one or more processors on configured to determine a QG based on one or more of a size of a CU splitting node and a value of a region-based parameter, determine a single quantization parameter for all blocks of video data within the determined quantization group, and perform a quantization process on transform coefficients of all blocks of video data within the determined quantization group using the determined single quantization parameter.

In another example, an apparatus configured to code video data includes means for determining a QG based on one or more of a size of a CU splitting node and a value of a region-based parameter, means for determining a single quantization parameter for all blocks of video data within the determined quantization group, and means for performing a quantization process on transform coefficients of all blocks of video data within the determined quantization group using the determined single quantization parameter.

In another example, this disclosure describes a non-transitory computer-readable storage medium storing instructions that, when executed, causes one or more processors configured to code video data to determine a QG based on one or more of a size of a CU splitting node and a value of a region-based parameter, determine a single quantization parameter for all blocks of video data within the determined quantization group, and perform a quantization process on transform coefficients of all blocks of video data within the determined quantization group using the determined single quantization parameter.

The details of one or more examples are set forth in the accompanying drawings and the description below. Other features, objects, and advantages will be apparent from the description, drawings, and claims.

DETAILED DESCRIPTION

This disclosure is related to determining one or more quantization groups (QGs) in a picture of video data, and for techniques for generating syntax elements that may be used to determine the one or more QGs. The techniques of this disclosure may be used in the context of advanced video codecs, such as extensions of the High Efficiency Video Coding (HEVC) standard (ITU-T H.265), or the next generation of video coding standards, such as H.266/VVC (Versatile Video Coding).

Figure 1:
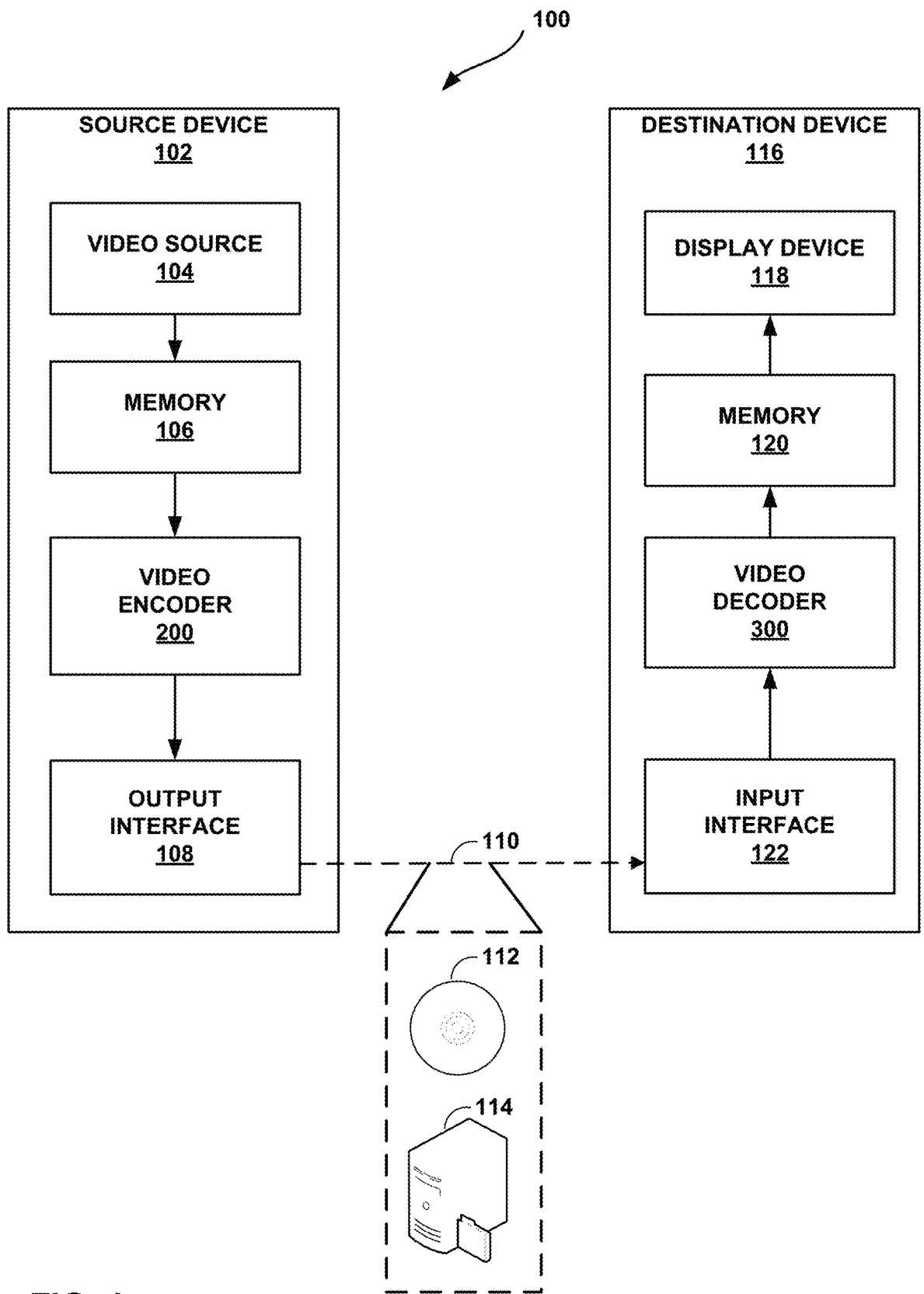
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure for determining quantization groups and quantizing transform coefficients within the determined quantization groups. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining quantization groups and quantizing transform coefficients within the determined quantization groups. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for determining quantization groups and quantizing transform coefficients within the determined quantization groups. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In some examples, video encoder 200 and video decoder 300 may operate according to ITU-T H.265, also referred to as HEVC, including the HEVC range extension, multiview extension (MV-HEVC) and/or scalable extension (SHVC). HEVC was developed by the Joint Collaboration Team on Video Coding (JCT-VC) as well as the Joint Collaboration Team on 3D Video Coding Extension Development (JCT-3V) of ITU-T Video Coding Experts Group (VCEG) and ISO/IEC Motion Picture Experts Group (MPEG).

ITU-T VCEG (Q6/16) and ISO/IEC MPEG (JTC 1/SC 29/WG 11) are now studying the potential need for standardization of future video coding technology with a compression capability that exceeds that of the current HEVC standard (including its current extensions and near-term extensions for screen content coding and high-dynamic-range coding). The groups are working together on this exploration activity in a joint collaboration effort, known as the Joint Video Exploration Team (JVET), to evaluate compression technology designs proposed by their experts in this area. The JVET first met during 19-21 Oct. 2015. One version of the reference software, i.e., Joint Exploration Model 3 (JEM 3) could be downloaded from: https://jvet.hhi.fraunhofer.de/svn/svn_HMJEMSoftware/tags/HM-16.6-JEM-3.0/. An algorithm description of JEM3 (J. Chen, et al. "Algorithm Description of Joint Exploration Test Model 3," Joint Video Exploration Team (JVET) of ITU-T SG 16 WP 3 and ISO/IEC JTC 1/SC 29/WG 11, $3^{rd}$ Meeting: Geneva, CH, 26 May-1 Jun. 2016, "JVET-C1001_v3") may be downloaded from http://phenix.it-sudparis.eu/jvet/doc_end_user/current_document.php?id=2714.

An early draft for a new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina.

In other examples, video encoder 200 and video decoder 300 may operate according to other proprietary or industry standards, such as JEM3, VVC, and future video coding standards. The techniques of this disclosure, however, are not limited to any particular coding standard.

In accordance with one or more examples of the disclosure that will be described in more detail below, video encoder 200 and video decoder 300 may be configured to determine a QG based on one or more of a size of a CU splitting node and a value of a region-based parameter, determine a single quantization parameter for all blocks of video data within the determined quantization group, and perform a quantization process on transform coefficients of all blocks of video data within the determined quantization group using the determined single quantization parameter.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

HEVC defines various blocks, including coding units (CUs), prediction units (PUs), and transform units (TUs). In HEVC, the largest coding unit in a slice is called a coding tree unit (CTU). A CTU contains one luma coding tree block (CTB) and two chroma CTBs, the node of which are luma and chroma coding block (CB). One luma CB and ordinarily two chroma CBs, together with associated syntax, form a coding unit.

Figure 2A:
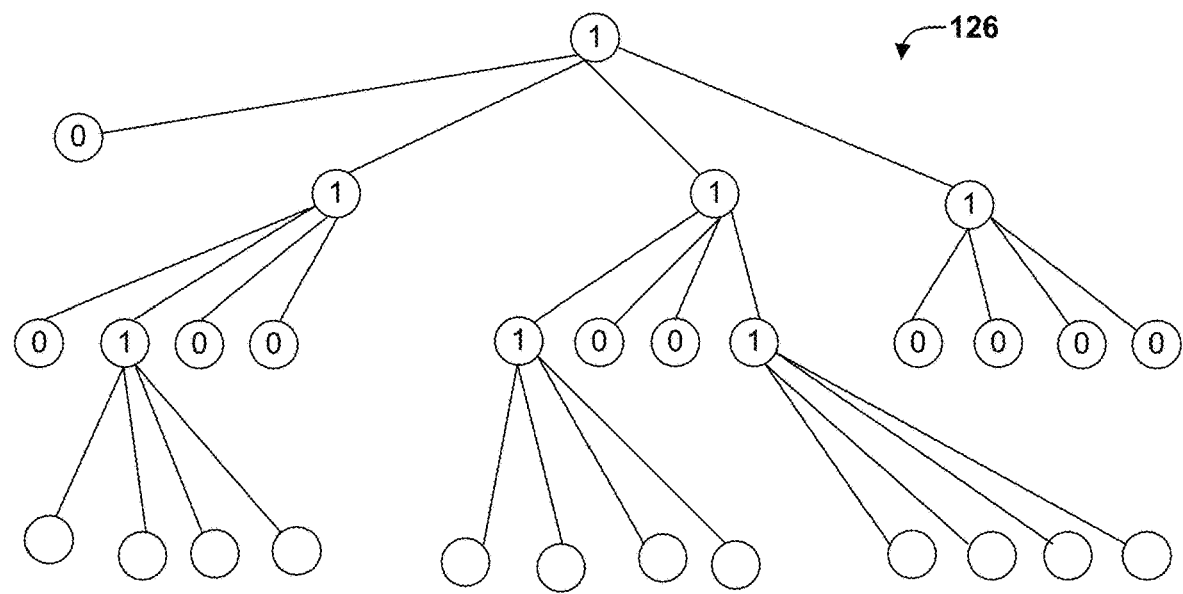
FIG. 2A and FIG. 2B are conceptual diagrams illustrating an example quadtree partitioning structure and a corresponding coding tree unit (CTU).
Figure 2B:
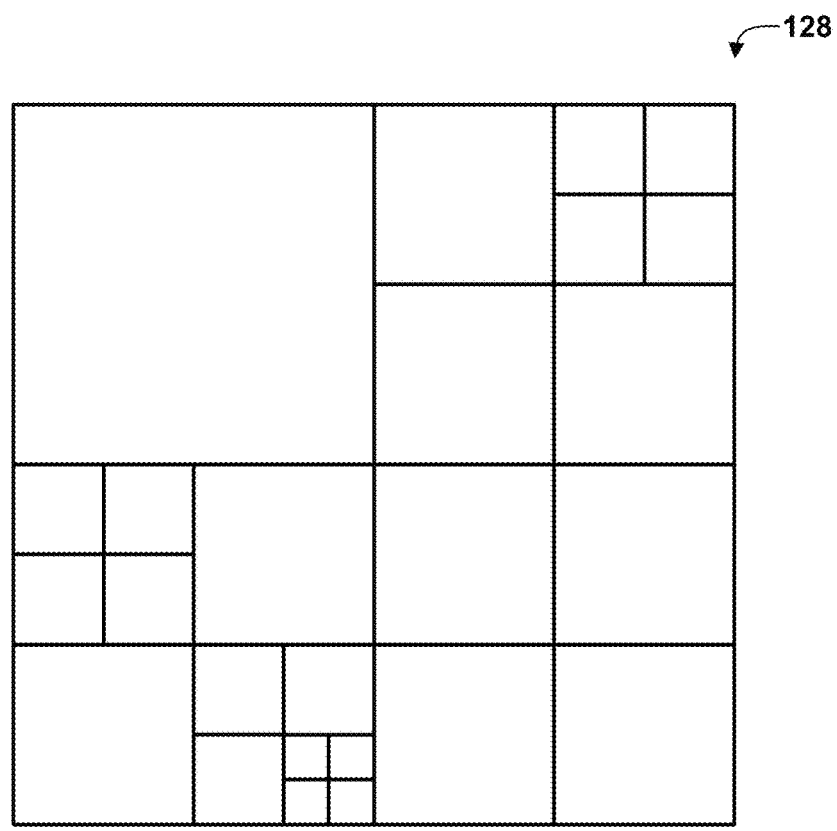

Video encoder 200 may recursively split a CTU into CUs in a quadtree manner, such as shown in FIG. 2A and FIG. 2B. FIG. 2A and FIG. 2B are conceptual diagrams illustrating an example quadtree partitioning structure 126 and a corresponding CTU 128. In each split (i.e., non-leaf) node of the binary tree structure 126 (also called a splitting tree), one flag (e.g., a split flag) is signaled to indicate whether or not a block at the node is split into four equal-sized blocks, where 0 indicates a block at the node is not split and 1 indicates that the block at the node is split. In the following context, every tree node of the CU splitting tree is termed as a CU splitting node.

The size of a luma CTB can range from 16×16 to 64×64 in the HEVC main profile (although technically 8×8 CTB sizes can be supported). A CU could be the same size of a CTB although it can be as small as 8×8. Each coding unit, i.e., leaf node in the coding tree, is coded with one mode which could be either intra mode or inter mode.

Video encoder 200 may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. One example of JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Quantization groups and delta quantization parameter (QP) values in HEVC in HEVC will now be discussed. Video encoder 200 may be configured to change the quantization step size (and therefore the QP value) within a picture for, e.g., rate control and perceptual quantization purposes. HEVC allows for transmission of one delta QP value at each quantization group (QG) level to allow for QP changes within a picture. This is similar to H.264/AVC that allows for modification of QP values at a macroblock level. The QG size is a multiple of the coding unit size that can vary from 8×8 to 64×64, depending on the CTU size and the value of the syntax element diff_cu_qp_delta_depth. The value of the syntax element diff_cu_qp_delta_depth indicates the difference between the luma coding tree block size and the minimum luma coding block size of coding units that convey the value of delta QP.

In one example, video encoder 200 only signals the delta QP in coding units with non-zero transform coefficients. If the CTU is split into coding units that are greater than the QG size, then a delta QP value is signaled at a coding unit (with non-zero transform coefficients) that is greater than the QG size. If the CTU is split into coding units that are smaller than the QG size, all the coding units within the QG share the same delta QP and the delta QP value is signaled in the first coding unit with non-zero transform coefficients in the QG. If a QG has coding units with all zero-valued transform coefficients (e.g., if the merge mode is used in all the coding units of the QG), then video encoder 200 will not signal the delta QP. In summary, the QG is specified as the CU splitting node if any one of the following conditions is satisfied:
  i. The size of the CU splitting node is equal to QG size.
  ii. The size of the CU splitting node is larger than QG size and the CU splitting node is a leaf coding unit.

The QP predictor used for calculating the delta QP is a combination of a QP value from the left QG relative to the current block, a QP value from the above QG relative to the current block, or a QP value from the previous QG in decoding order. Video encoder 200 calculates a delta QP by subtracting the QP predictor for the QG from the QP for the QG. Video decoder 300 recovers the QP for the QG by adding the delta QP for the QG to the QP predictor for the QG. In examples of HEVC, video encoder 200 and video decoder 300 may determine the QP predictor using one of two predictive techniques: spatial QP prediction (from left and above QGs) or previous QP prediction. Determining the QP predictor uses spatial prediction from left (QPLEFT) and above (QPABOVE) within a CTU and uses the previous QP as predictor at the CTU boundary. The spatially adjacent QP values, QPLEFT and QPABOVE are considered to be unavailable when they are in a different CTU or if the current QG is at a slice/tile/picture boundary. When a spatially adjacent QP value is not available, the spatially adjacent QP value is replaced with the previous QP value (QPPREV). QPPREV is the previous QP value in decoding order. The previous QP (QPPREV) for a CTU is initialized to the last coded QP in the previous CTU (raster order) or slice QP value if the CTU is at the beginning of the slice, tile or wavefront.

CU structures beyond HEVC and their signaling will now be discussed. In VCEG proposal COM16-C966 (J. An, Y.-W. Chen, K. Zhang, H. Huang, Y.-W. Huang, and S. Lei., "Block partitioning structure for next generation video coding", International Telecommunication Union, COM16-C966, September 2015), a quadtree-binary-tree (QTBT) partitioning structure was proposed for future video coding standards beyond HEVC. Simulations showed that the proposed QTBT structure is more efficient than the quadtree structure used in HEVC.

In the proposed QTBT structure, video encoder 200 first partitions a CTB with a quadtree structure, where the quadtree splitting of one node can be iterated until the node reaches the minimum allowed quadtree leaf node size (MinQTSize). If the quadtree leaf node size is not larger than the maximum allowed binary tree root node size (MaxBTSize), the node can be further partitioned by a binary tree. In binary tree splitting, a block is split into two blocks, either horizontally or vertically. In this example, there are two splitting types: symmetric horizontal splitting and symmetric vertical splitting. The binary tree splitting of one node can be iterated until the node reaches the minimum allowed binary tree leaf node size (MinBTSize) or the maximum allowed binary tree depth (MaxBTDepth). In this example, the binary tree leaf node is the CU, which will be used for prediction (e.g. intra-picture or inter-picture prediction) and transform without any further partitioning.

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. Video encoder 200 applies quadtree partitioning to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node will be further partitioned by the binary tree. Therefore, the quadtree leaf node is also the root node for the binary tree and has the binary tree depth as 0. When the binary tree depth reaches MaxBTDepth (i.e., 4), it implies that there is no further splitting. When the binary tree node has width equal to MinBTSize (i.e., 4), it implies that there is no further horizontal splitting. Similarly, when the binary tree node has height equal to MinBTSize, it implies that there is no further vertical splitting. The leaf nodes of the binary tree (namely the CUs) are further processed by prediction and transform without any further partitioning.

Figure 3A:
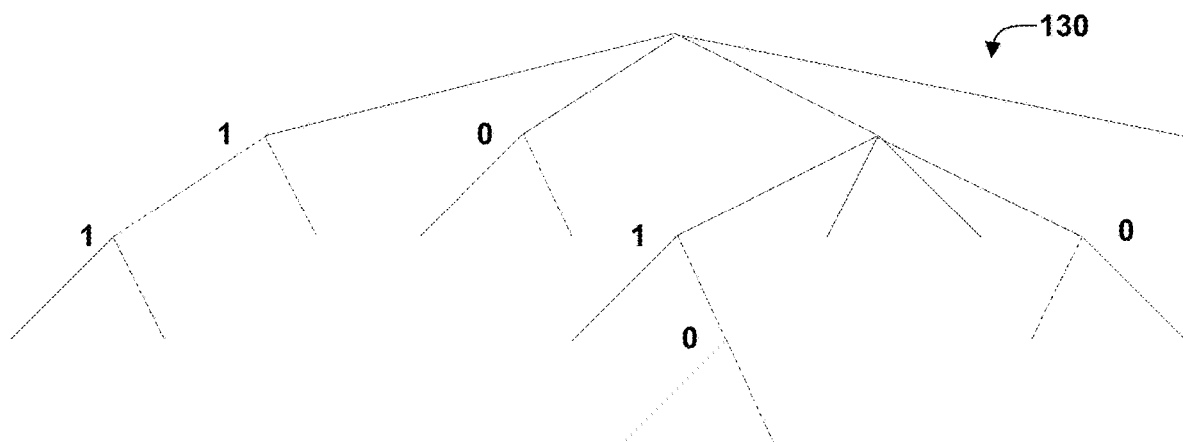
FIG. 3A and FIG. 3B are conceptual diagrams illustrating an example quadtree binary tree (QTBT) partitioning structure and a corresponding CTU.
Figure 3B:
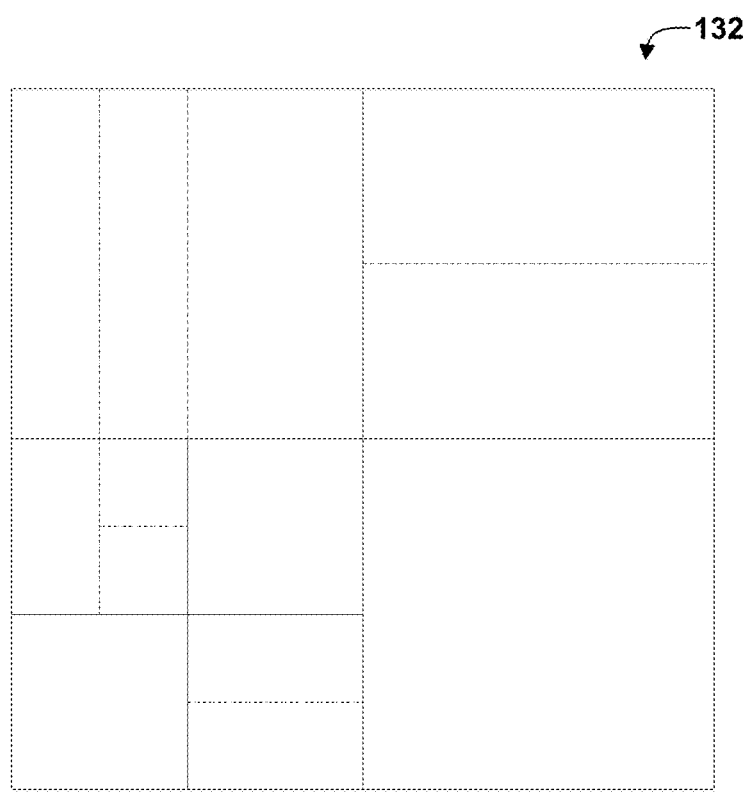

FIG. 3A and FIG. 3B are conceptual diagrams illustrating an example QTBT partitioning structure 130 and a corresponding CTU 132. The solid lines represent quadtree splitting, and dashed lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

Figure 4A:
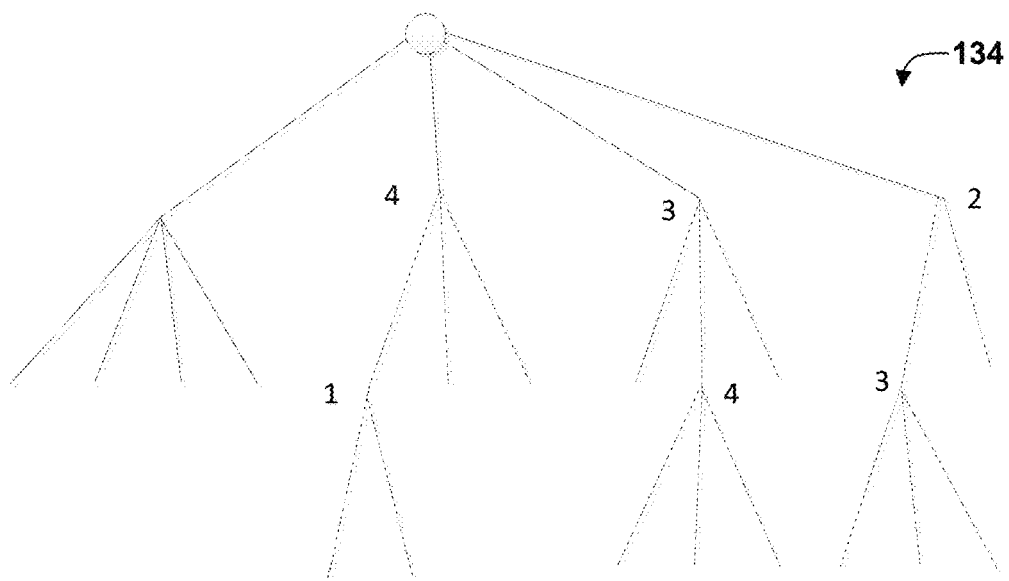
FIG. 4A and FIG. 4B are conceptual diagrams illustrating an example multi-type-tree (MTT) partitioning structure and a corresponding CTU.
Figure 4B:
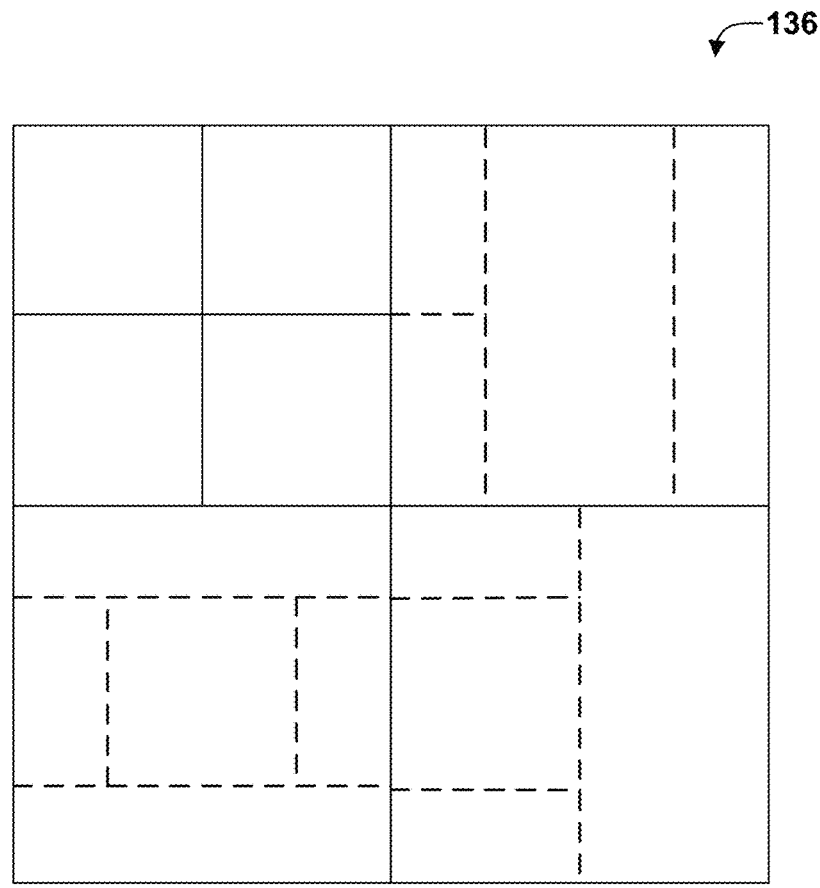

A multi-type-tree (MTT) partitioning structure will no be described. In U.S. Patent Publication No. 2017/0208336, filed Jan. 12, 2017, and U.S. Patent Publication No. 2017/0272782, filed Mar. 20, 2017, the entire content of each of which is incorporated by reference herein, example MTT partition structures are described. According to example MTT partitions structures, video encoder 200 may be configured to further split a tree node with multiple tree types, such as binary tree, symmetric center-side triple tree, and quadtree. In the two-level MTT structure, a Region Tree (RT) is constructed first with quadtree partitions of a CTU, followed by the construction of a Prediction Tree (PT), where only binary tree and the symmetric center-side triple tree can be expanded. FIG. 4A and FIG. 4B are conceptual diagrams illustrating an example MTT partitioning structure 134 and a corresponding CTU 136.

Figure 5:
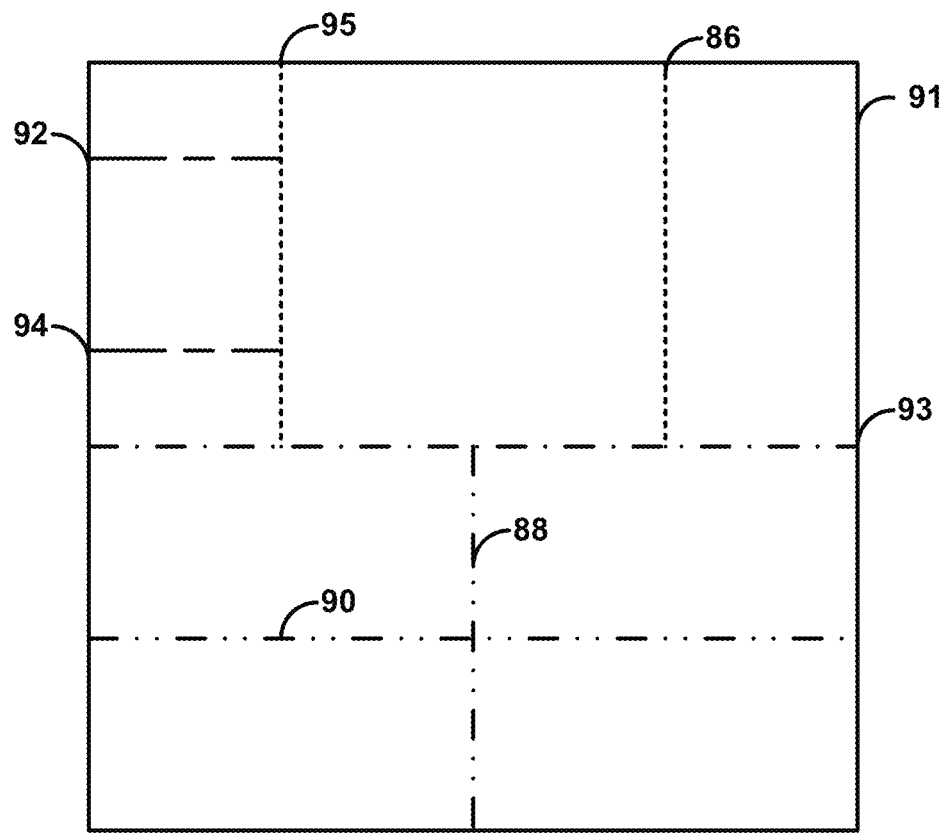
FIG. 5 is a conceptual diagram illustrating another example of a CTU partitioned according to an MTT partitioning structure.

FIG. 5 is a conceptual diagram illustrating another example of a CTU partitioned according to an MTT partitioning structure. In other words, FIG. 5 illustrates the partitioning of a CTB 91 corresponding to a CTU. In the example of FIG. 5:

At depth 0, CTB 91 (i.e., the whole CTB) is split into two blocks with horizontal binary-tree partitioning (as indicated by line 93 with dashes separated by single dots).
At depth 1:
The upper block is split into three blocks with vertical center-side triple-tree partitioning (as indicated by lines 95 and 86 with small dashes).
The bottom block is split into four blocks with quadtree partitioning (as indicated by lines 88 and 90 with dashes separated by two dots).
At depth 2:
The left side block of the upper block at depth 1 is split into three blocks with horizontal center-side triple-tree partitioning (as indicated by lines 92 and 94 with long dashes separated by short dashes).
No further split for the center and right blocks of the upper block at depth 1.
No further split for the four blocks of the bottom block at depth 1.

As can be seen in the example of FIG. 5, three different partition structures are used (BT, QT, and TT) with four different partition types (horizontal binary-tree partitioning, vertical center-side triple-tree partitioning, quadtree partitioning, and horizontal center-side triple-tree partitioning).

Compared to the CU structure in HEVC and the QTBT structure, an MTT partitioning structure may provide better coding efficiency as the block partitions are more flexible. In addition, the introduction of the center-side triple tree partitions provides more flexible localization of video signals. In the MTT partitioning structure, three bins are used to determine the block partition at each PT node (except for conditions where some constraints can be imposed, such as described in U.S. Patent Publication No. 2017/0272782) to represent block partitions of non-split, horizontal binary tree, vertical binary tree, horizontal triple tree, and vertical triple tree partitions. Due to the newly introduced triple partitions (triple-tree (TT) partitions), the number of bits used to signal the tree types will be increased from HEVC.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT or MTT structure for the luminance component and another QTBT or MTT structure for both chrominance components (or two QTBT or MTT structures for respective chrominance components).

As will be described in more detail below, in accordance with the techniques of this disclosure, video encoder 200 and video decoder 300 may be configured to determine a quantization group (QG) for a coding unit (CU) splitting node of video data based one or more of a size of the CU splitting node and a value of a region-based parameter (QG_Region), determine a quantization parameter for the determined quantization group, and perform a quantization process on transform coefficients of blocks of video data the determined quantization group.

As described above, in HEVC and VCEG proposal COM16-C966, a QG is specified as being dependent on the CTU size and the value of the syntax element diff_cu_qp_delta_depth. The maximum depth for delta QP (MaxCuDQPDepth) is defined as 2×diff_cu_qp_delta_depth, and the QG area is equal to CTU area >>MaxCuDQPDepth, where >> is a binary right shift. In both HEVC (quadtree partition) and the VCEG proposal (QTBT partition), the area of each CU splitting node, and thus the specification of the QG, can be fully determined based on the quadtree depth (QTDepth) and/or binary tree depth (BTDepth) of the CU splitting node. For example, the area of a CU splitting node of quadtree depth QTDepth in HEVC is equal to CTU area >>2×QTDepth, where >> is a binary right shift. Therefore, the QG is specified in HEVC as the CU splitting node of quadtree depth QTDepth if any one of the following conditions is satisfied.

i. 2×QTDepth is equal to MaxCuDQPDepth.
ii. 2×QTDepth is smaller than MaxCuDQPDepth and the CU splitting node is a leaf coding unit.

Similarly, in VCEG proposal COM16-C966, a QG is specified as the CU splitting node of quadtree depth QTDepth and binary tree depth BTDepth if any one of the following conditions is satisfied.

i. BTDepth+2×QTDepth is equal to MaxCuDQPDepth.
ii. BTDepth+2×QTDepth is smaller than MaxCuDQPDepth and the CU splitting node is a leaf coding unit.

Figure 6:
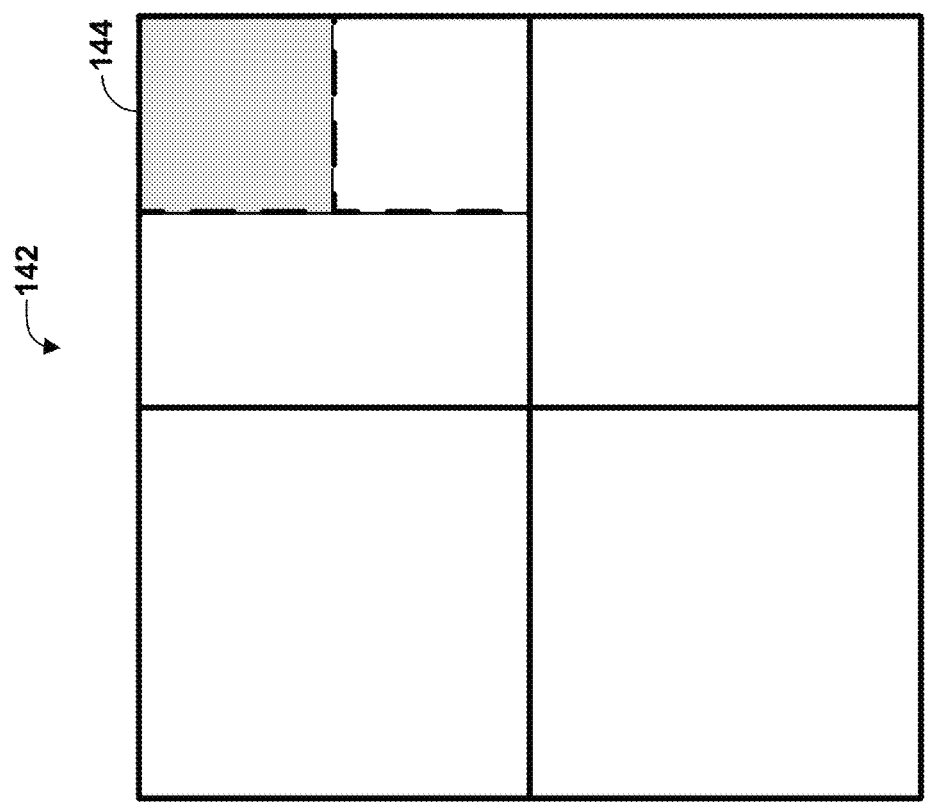
FIG. 6 is a conceptual diagram illustrating an example of two quantization groups (QGs) derived by different types of tree partitions from a CTU.
Figure 6:
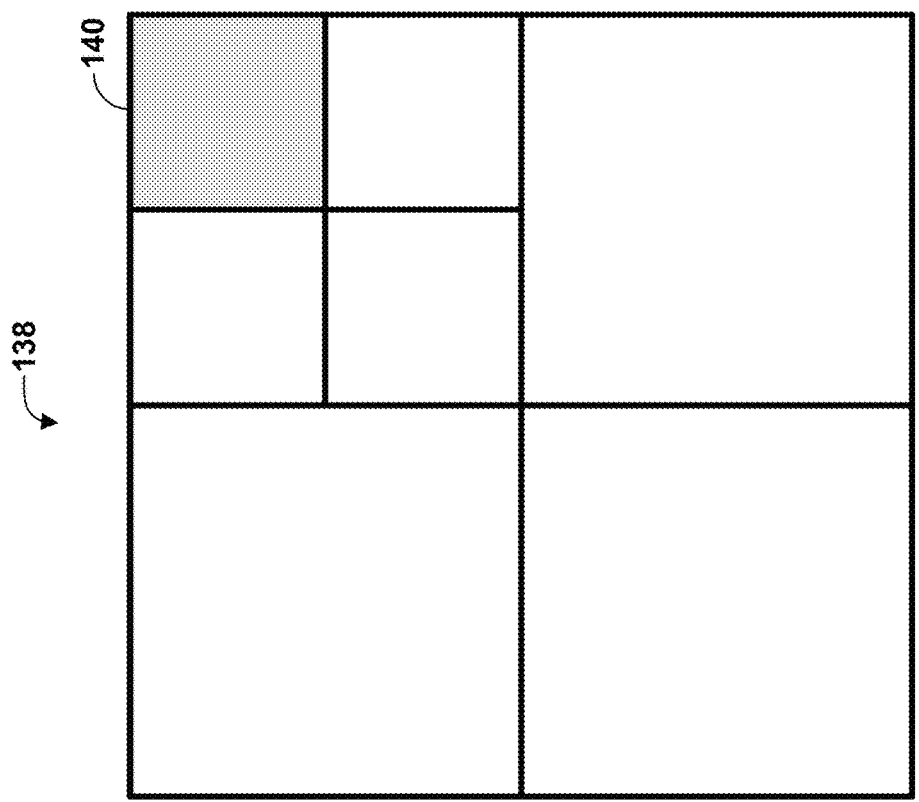

FIG. 6 is a conceptual diagram illustrating an example of two QGs derived by different types of tree partitions from a CTU. For CTU 138, QG 140 (highlighted) is derived with 2 quadtree split (QTDepth=2). For CTU 142, QG 144 is derived with 1 quadtree split (QTDepth=1) and 2 binary-tree split (BTDepth=2). Since BTDepth+2×QTDepth is equivalent, the two QG's have the same size regardless of the partition type.

Figure 7:
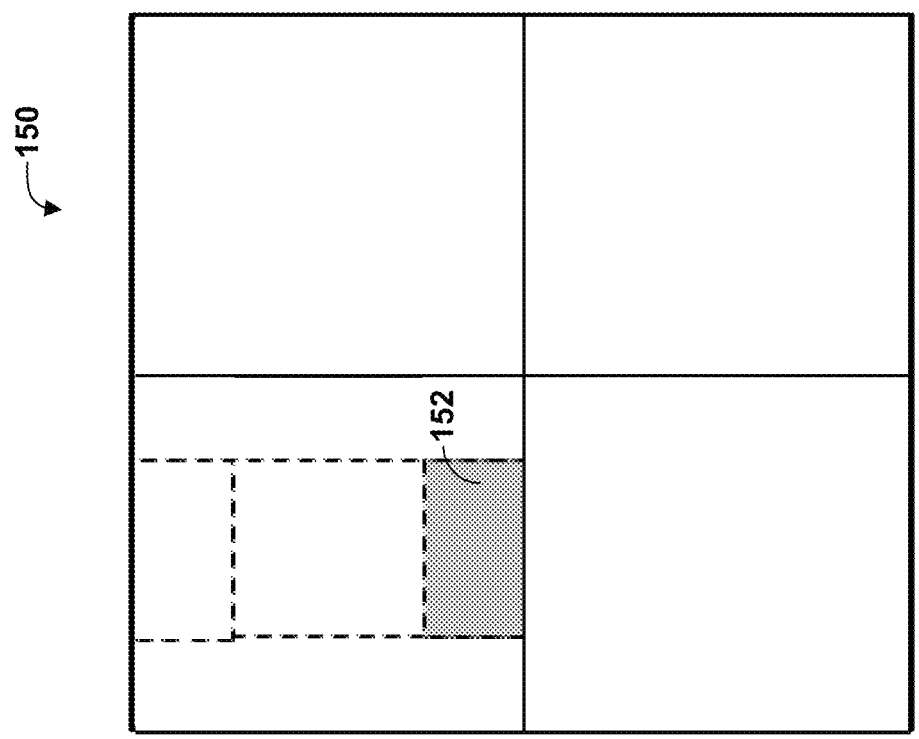
FIG. 7 is a conceptual diagram illustrating an example of two quantization groups (QGs) derived for a CTU partitioned with an MTT partitioning structure.
Figure 7:
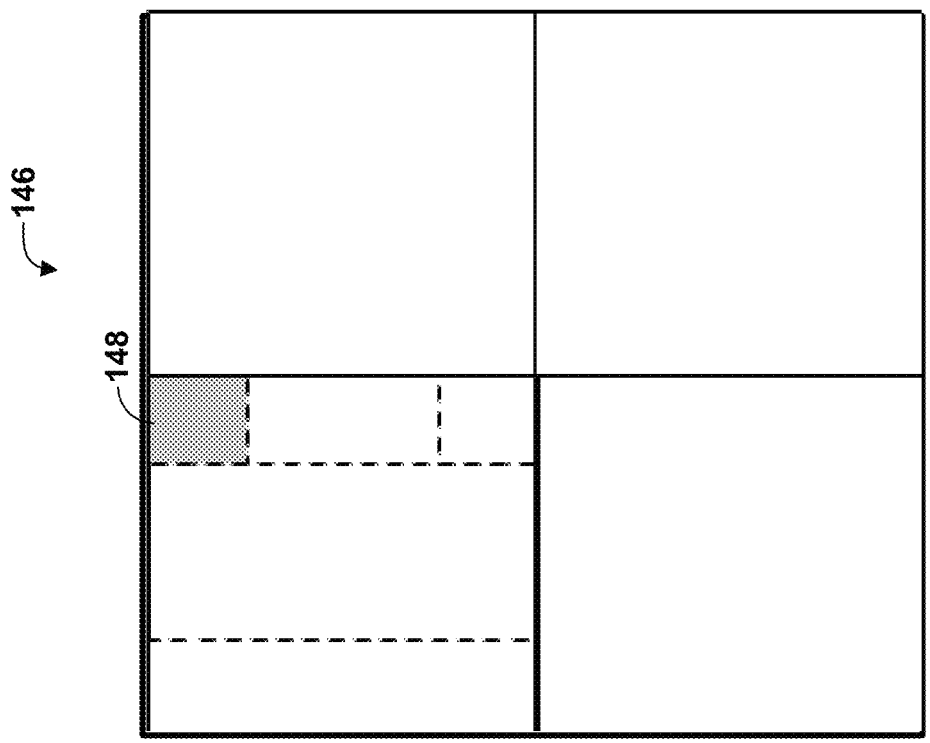

However, only specifying the depth may result in ambiguity of determining a QG when an MTT partitioning structure (with additional triple tree) is used. FIG. 7 is a conceptual diagram illustrating an example of two quantization groups (QGs) derived for a CTU partitioned with an MTT partitioning structure. As shown in FIG. 7, QG 148 of CTU 146 has a different area as compared to QG 152 of CTU 150 even though the tree depths for QTDepth, BTDepth and TTDepth are the same (both with QTDepth=1 and TTDepth=2) for each QG. Different from quadtree and QTBT partitions, where a CU is split into sub-blocks of the same size, in a triple tree TT partition (such as found in MTT partitioning), a CU of area N is divided into two sub-blocks of area N/4 and one sub-block of area N/2. Therefore, the size of a CU splitting node derived from a TT partition cannot be determined given only the partition depth.

In view of the potential ambiguities with MTT partition structures, this disclosure describes the following techniques for defining and determining QGs and techniques for performing QP prediction for MTT partition structures. The techniques of this disclosure are not limited to MTT partition structures, but may be used with any partition structure that uses triple-tree partition structures.

In examples of the disclosure, video encoder 200 may specify a QG using a region-based parameter (e.g., called QG_Region). Likewise, video decoder 300 may determine a QG based on the value of the region-based parameter QG_Region. The value of the region-based parameter QG_Region may specify a size, either in terms of total number of samples/pixels, or in terms of width and height of a block of samples/pixels.

In accordance with one example of the disclosure, video encoder 200 and video decoder 300 may determine a QG based on one or more of a size of a CU splitting node and a value of a region-based parameter (QG_Region), determine a single quantization parameter for all blocks of video data within the determined quantization group, and perform a quantization process on transform coefficients of all blocks of video data within the determined quantization group using the determined single quantization parameter. The following are some examples of specifying and determining a QG in accordance with the techniques of this disclosure.

In one example of the disclosure, video encoder 200 and video decoder 300 may be configured to determine that the QG is the same as a particular CU splitting node if all the conditions of any of the following sets are true (e.g., all conditions of Set1 are true or all conditions of Set2 are true).

Set1:
i. The area of the CU splitting node is larger than or equal to the value of QG_Region.
ii. The area of any one of the child nodes of the CU splitting node is smaller than the value of QG_Region.
iii. The QG has not been specified as any one of the ancestor nodes of the CU splitting nodes. An ancestor node is a CU from which the CU splitting nodes was split.

Set2:
i. The area of the CU splitting node is larger than or equal to the value of QG_Region.
ii. The CU splitting node is a leaf node.
iii. The QG has not been specified as any one of the ancestor nodes of the CU splitting nodes.

Figure 8:
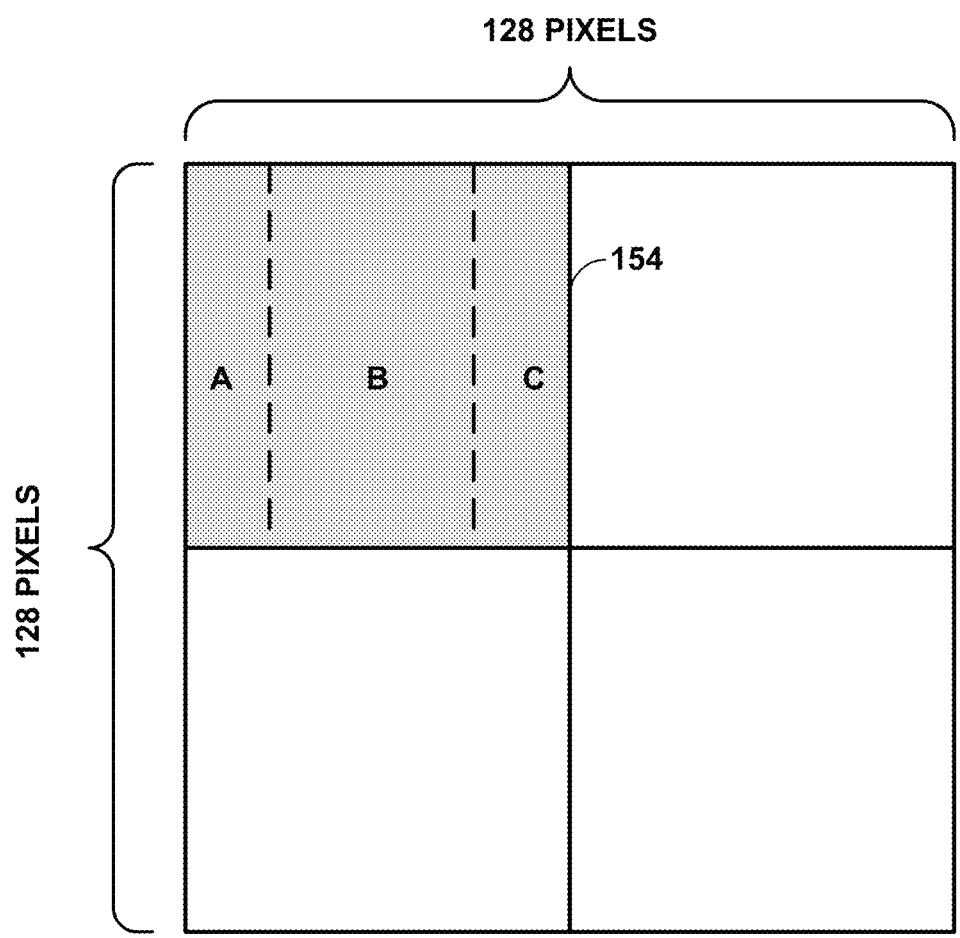
FIG. 8 is one example of QG derivation according to the techniques of this disclosure.

In the example shown in FIG. 8, if the value of QG_Region is 1024 (e.g., 32×32=1024), the QG is specified as the upper left CU splitting node 154 (highlighted block) that includes child nodes A, B, and C, since there exists at least one child node (A and C in the example) with a size smaller than the value of QG_Region. Note that in this example, the value QG_Region is specified as the total number of pixels in the QG. In other examples, the value of QG_Region may be specified by only the width and/or height of the QG. In still other examples, the value of QG_Region may be an index to a predetermined table that indicates the size of the QG.

In another example of the disclosure, video encoder 200 and video decoder 300 may determine that the QG is specified as the CU splitting nodes if all the conditions of any of the following sets are true (e.g., all conditions of Set3 are true or all conditions of Set4 are true).

Set3:
i. The area of the CU splitting node is smaller than or equal to the value of QG_Region.
ii. The area of the parent node of the CU splitting node is larger than the value of QG_Region.

Set4:
iii. The area of the CU splitting node is larger than the value of QG_Region.
iv. The CU splitting node is a leaf node.

Figure 9:
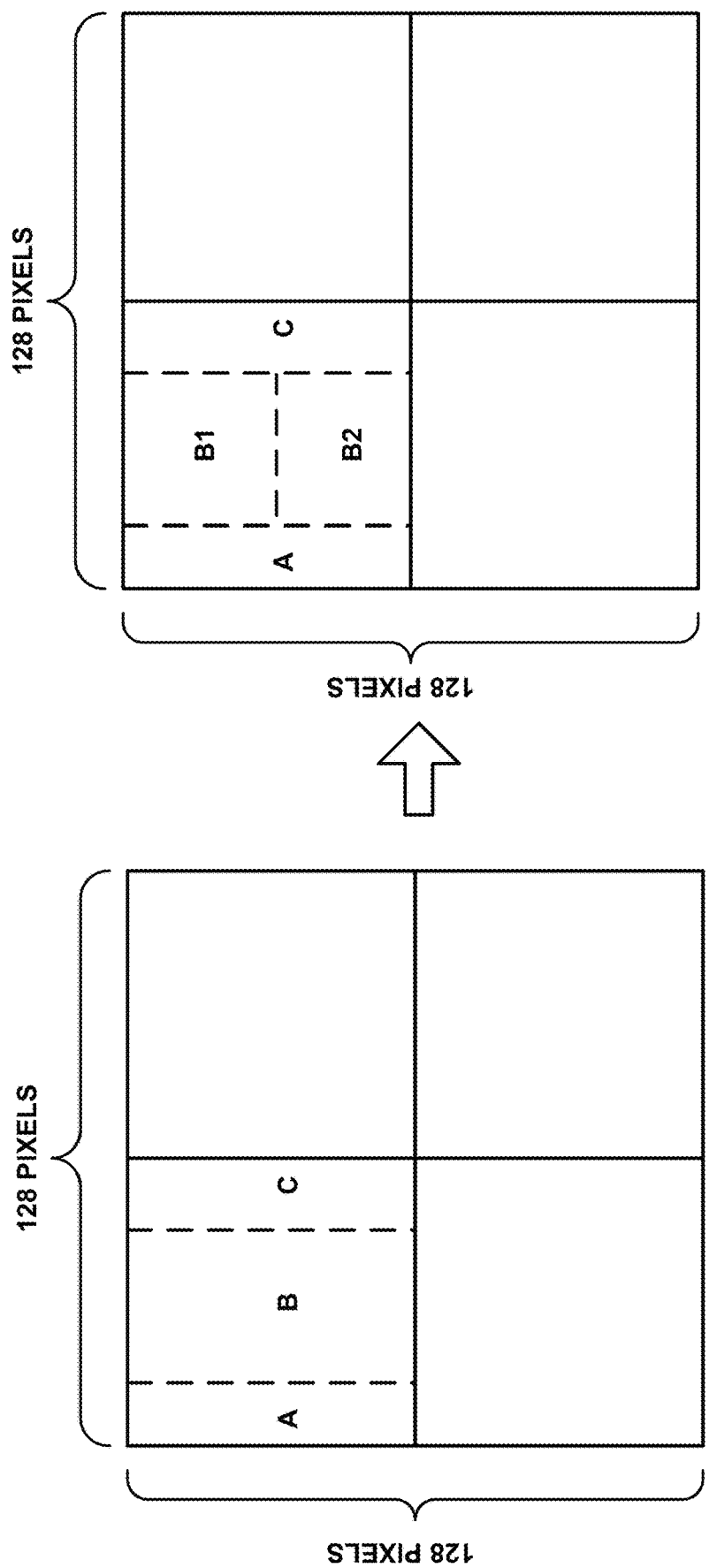
FIG. 9 is another example of QG derivation according to the techniques of this disclosure.

In the example shown in FIG. 9 (where the value of region-based parameter QG_Region indicates a QG size of 2×32=1024), video encoder 200 and video decoder 300 may determine that two QGs are specified separately as splitting nodes A and C. Video encoder 200 and video decoder 300 may further determine another two QGs will be specified as the child nodes $B_1$ and $B_2$ of B, since the sizes of $B_1$ and $B_2$ size are both smaller than the value of region-based parameter QG_Region and the area of their parent node B is larger than the value of region-based parameter QG_Region.

In another example of the disclosure, video encoder 200 and video decoder 300 may be configured to determine the value of the region-based parameter QG_Region as MaxDQPRegionPara*MaxDQPRegionPara, where the value MaxDQPRegionPara is signaled in a PPS. Below are several examples of the signaling:

Video encoder 200 may signal the difference of MaxDQPRegionPara from the CTU size: For CTU size=$2^N$ and MaxDQPRegionPara=$2^M$, where video encoder 200 signals the value of N−M. Video decoder 300 would be configured to recover the value of M by determining the CTU size, determining the value N from the CTU size, and then recovering the value of M. Video decoder 300 would then determine the value of MaxDQPRegionPara from the equation MaxDQPRegionPara=$2^M$.

Video encoder 200 may signal the specific value of MaxDQPRegionPara (e.g., M in the last example).

In another example of the disclosure, video encoder 200 and video decoder 300 may be configured to determine the value of the region-based parameter QG_Region as MaxDQPRegionPara1*MaxDQPRegionPara2, where video encoder 200 signals the data indicative of the values of MaxDQPRegionPara1 and MaxDQPRegionPara2 in a picture parameter set (PPS). Below are several examples of the signaling:

Video encoder 200 may signal the difference of MaxDQPRegionPara1(2) from a CTU size: For CTU size=$2^N$ and MaxDQPRegionPara1(2)=$2^{M1(2)}$, the values N−M1 and N−M2 are signaled.

Video encoder 200 may signal the specific value of MaxDQPRegionPara1(2) (e.g., M1 and M2 in the last example).

Video encoder 200 may signal the shortest value between MaxDQPRegionPara1 and MaxDQPRegionPara2 and their difference. For example, video encoder 200 may signal
min(MaxDQPRegionPara1, MaxDQPRegionPara2) and
abs(MaxDQPRegionPara2−MaxDQPRegionPara1).

In another example of the disclosure, video encoder 200 and video decoder 300 may be configured to determine the value of the region-based parameter QG_Region as MaxDQPRegionPara, which is signaled in a PPS. Below are several examples of the signaling:

Video encoder 200 may signal the difference of MaxDQPRegionPara1(2) from a CTU area: For CTU area=$2^X$ and MaxDQPRegionPara=$2^Y$, the value X−Y is signaled.

Video encoder 200 may signal the specific value of MaxDQPRegionPara (e.g., Y in the last example).

In another example, this disclosure describes several modifications of a QP prediction process. As described above, video decoder 300 may receive a delta QP (dQP) value from video encoder 200. Video decoder 300 may recover the QP value for the QG by adding the delta QP value to the value of QP Predictor. In some examples, the QP Predictor may be the QP value from a previous block (QPPREV). For determining the value of QPPREV (i.e., the last QP in decoding order), video encoder 200 and video decoder 300 may perform any combination of the following techniques to reduce the amount and/or number of storage buffers used in determining QP values, as well as reduce the dependency between CTU's in determining QP values.

In one example of the disclosure, video encoder 200 and video decoder 300 may be configured to replace the value of QPPREV by a slice QP for QP prediction. The slice QP is a QP value for a slice.

In another example of the disclosure, video encoder 200 and video decoder 300 may be configured to derive a QP predictor as the average of the available neighboring QP values. For example, if both QPABOVE (i.e., a QP value from a block above the current block) and QPLEFT (i.e., a QP value from a block to the left of the current block) are available, video encoder 200 and video decoder 300 may be configured to calculate the QP predictor as (QPABOVE+QPLEFT+1)>>1, where >> is a logical right shift. If only one neighboring QP is available, video encoder 200 and video decoder 300 may be configured to determine that the value of the QP predictor is the value of the available QP neighbor (e.g., QPABOVE or QPLEFT). If there is no neighboring QP available (e.g., for the first QG in a CTU), video encoder 200 and video decoder 300 may be configured to determine that the value of the QP predictor is the value of the slice QP.

In another example of the disclosure, video encoder 200 and video decoder 300 may be configured to initialize the value of QPPREV as the slice QP for each CTU.

In another example of the disclosure, video encoder 200 and video decoder 300 may be configured to initialize the value of QPPREV as the slice QP if the CTU is at the beginning of a CTU row.

In another example of the disclosure, video encoder 200 and video decoder 300 may be configured to initialize the value of QPPREV to be the last coded QP of the above neighbor in the last CTU row.

Figure 10:
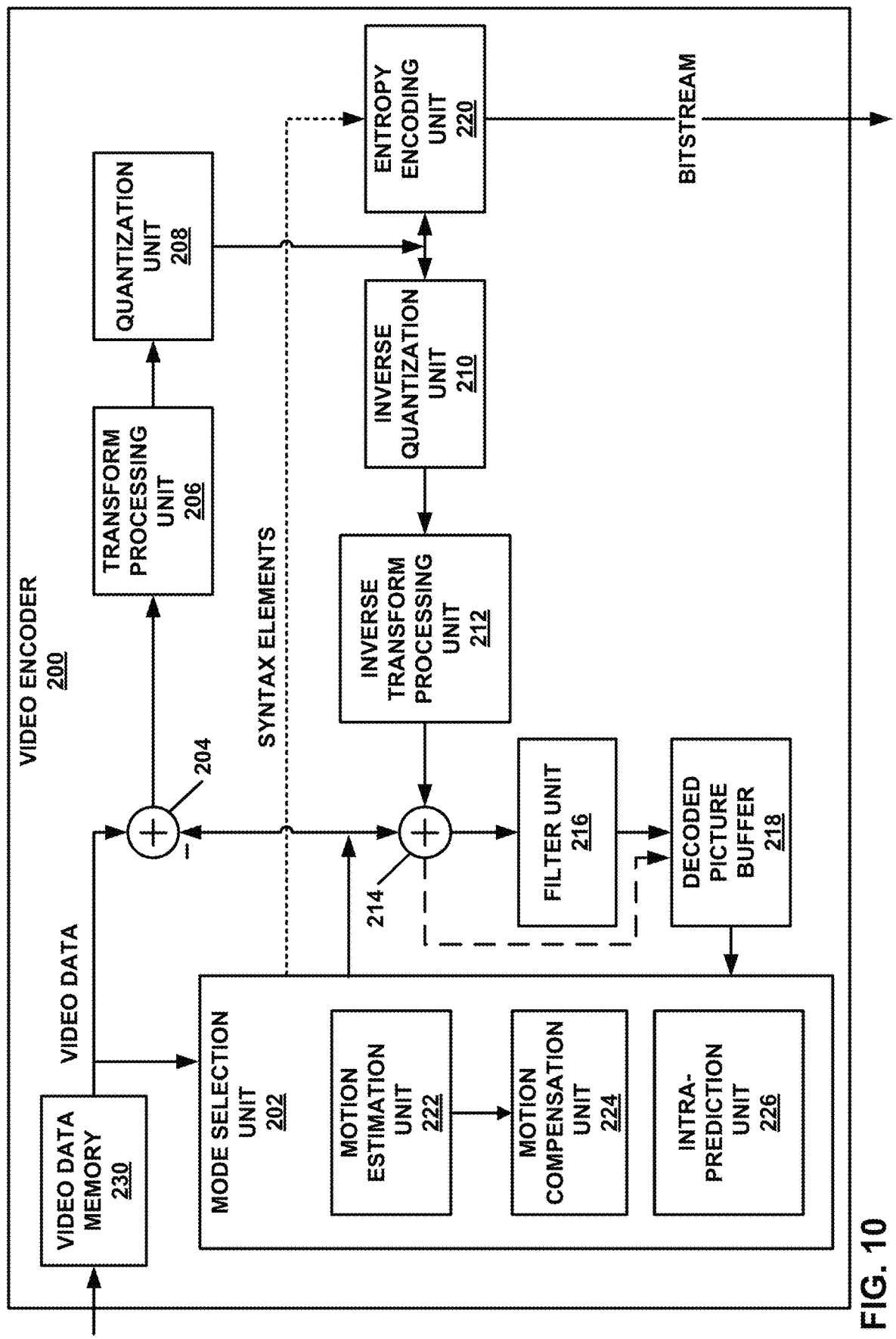
FIG. 10 is a block diagram illustrating an example video encoder that may perform the techniques of this disclosure.

FIG. 10 is a block diagram illustrating an example video encoder 200 that may perform the techniques of this disclosure described above. FIG. 10 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 10, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 10 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure, the quad-tree structure of HEVC, or the MTT structure described above. As described above, video encoder 200 may form one or more CUs from partitioning a CTU according to the tree structure. Such a CU may also be referred to generally as a "video block" or "block." Video encoder 200 may also determine quantization groups and perform quantization parameter prediction as described above.

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block. Thus, Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. As illustrated by dashed lines, operations of filter unit 216 may be skipped in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to determine a QG based on one or more of a size of a CU splitting node and a value of a region-based parameter, determine a single quantization parameter for all blocks of video data within the determined quantization group, and perform a quantization process on transform coefficients of all blocks of video data within the determined quantization group using the determined single quantization parameter.

Figure 11:
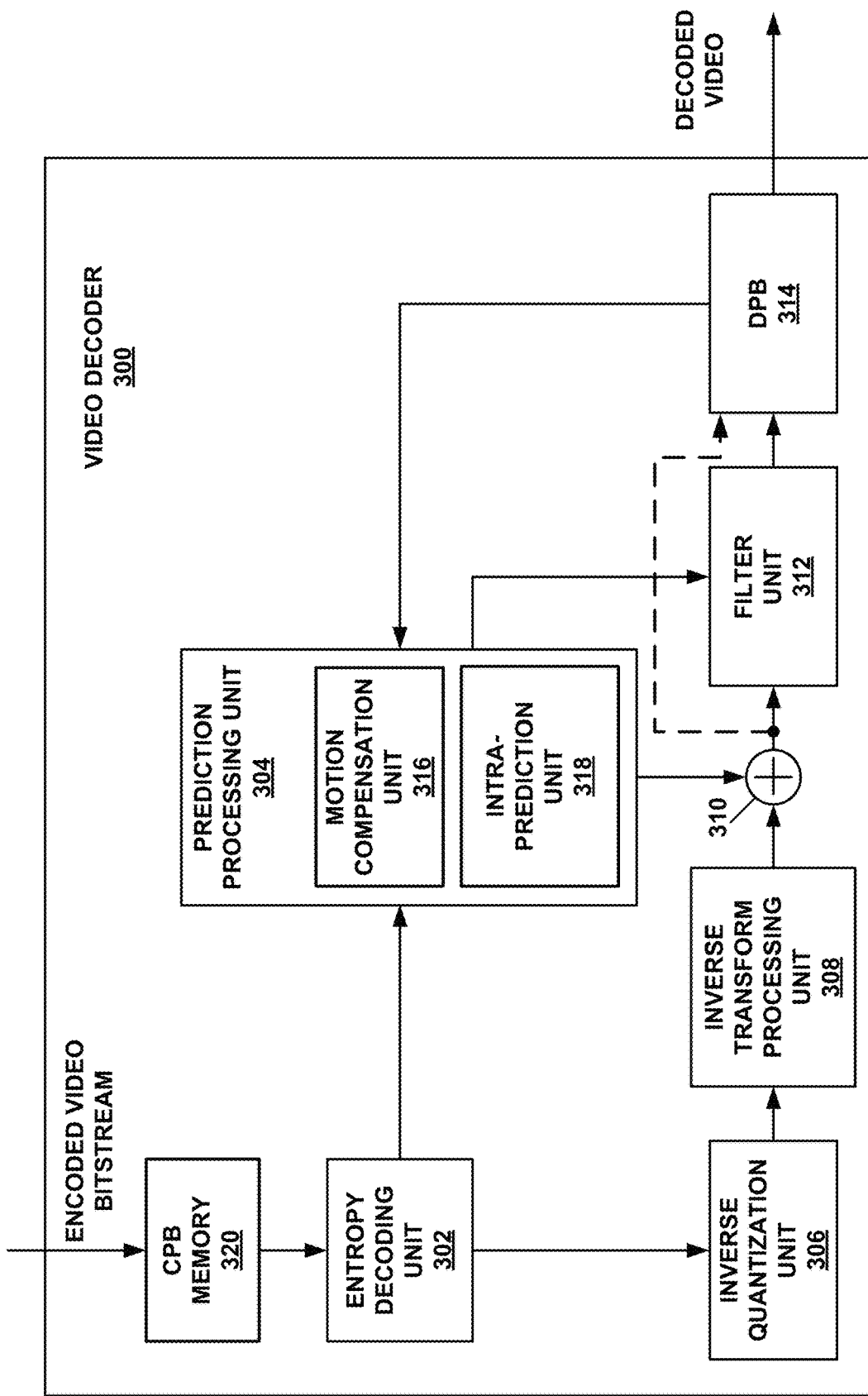
FIG. 11 is a block diagram illustrating an example video decoder that may perform the techniques of this disclosure.

FIG. 11 is a block diagram illustrating an example video decoder 300 that may perform the techniques of this disclosure. FIG. 11 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 11, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random-access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 11 are illustrated to assist with understanding the operations performed by video decoder 300. The units may be implemented as fixed-function circuits, programmable circuits, or a combination thereof. Similar to FIG. 10, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block"). CTUs of a picture may be partitioned in accordance with a tree structure, such as the QTBT structure, the quad-tree structure of HEVC, or the MTT structure described above. Video decoder 300 may also determine quantization groups and perform quantization parameter prediction as described above.

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 10).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 10). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. As illustrated by dashed lines, operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to determine a QG based on one or more of a size of a CU splitting node and a value of a region-based parameter, determine a single quantization parameter for all blocks of video data within the determined quantization group, and perform a quantization process on transform coefficients of all blocks of video data within the determined quantization group using the determined single quantization parameter.

Figure 12:
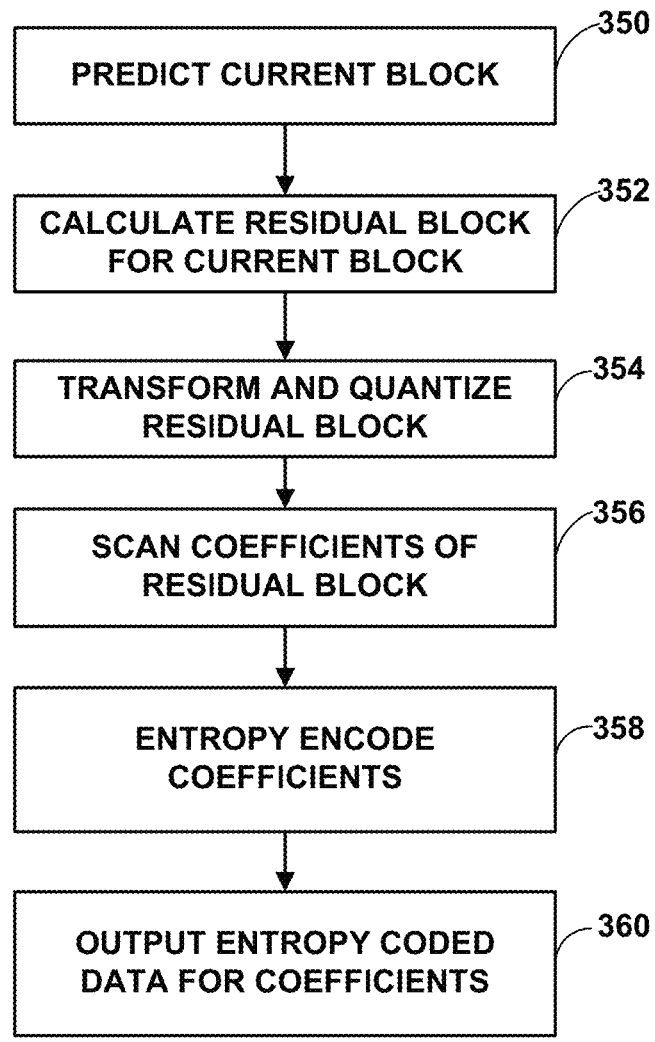
FIG. 12 is a flowchart illustrating an example method for encoding a current block.

FIG. 12 is a flowchart illustrating an example method for encoding a current block. The current block may comprise a current CU. Although described with respect to video encoder 200 (FIGS. 1 and 10, it should be understood that other devices may be configured to perform a method similar to that of FIG. 12.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 13:
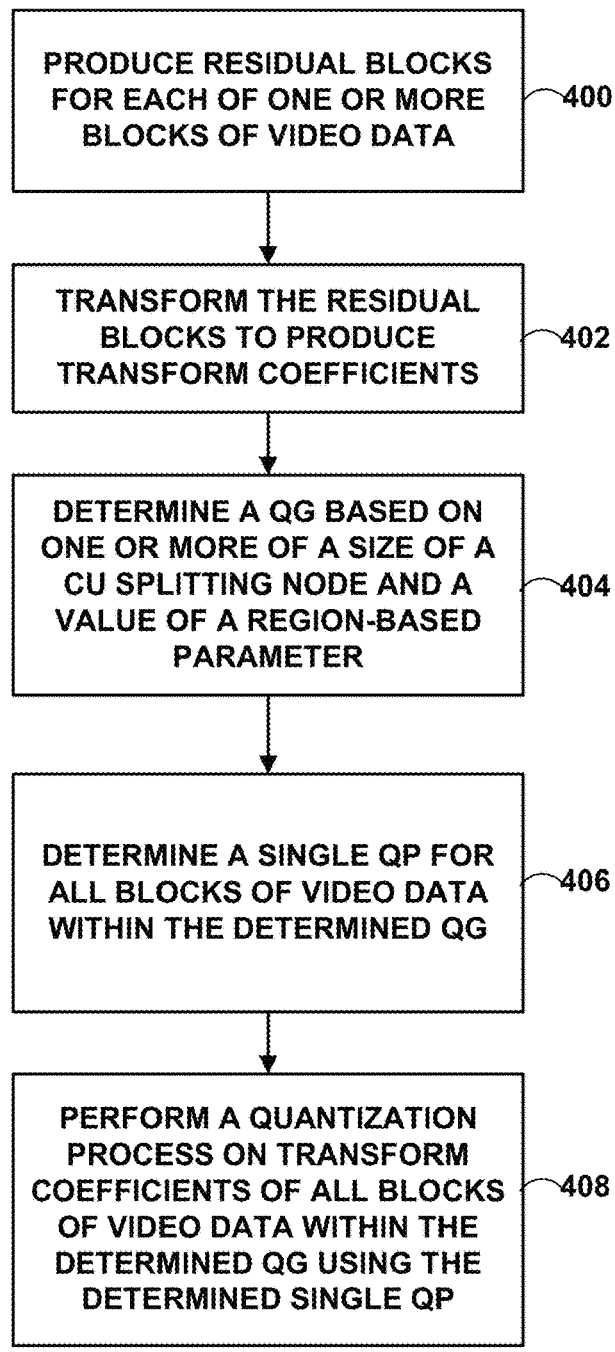
FIG. 13 is a flowchart illustrating an example technique for quantizing a block of video data according to an example encoding technique of the disclosure.

FIG. 13 is a flowchart illustrating an example technique for quantizing a block of video data (e.g., transform and quantize residual block 354 of FIG. 12) according to an example encoding technique of the disclosure. One or more structural components of video encoder 200 may be configured to perform the techniques of FIG. 13, including quantization unit 208.

In one example of the disclosure, video encoder 200 may be configured to produce a residual block (e.g., through inter prediction, intra prediction, or other prediction processes) for each of one or more blocks of video data (e.g., CUs of video data) (400), and transform the residual blocks to produce transform coefficients (402). Video encoder 200 may be further configured to determine a QG based on one or more of a size of a CU splitting node and a value of a region-based parameter (404).

Video encoder 200 may further determine a single quantization parameter (QP) for all blocks of video data within the determined QG (406), and perform a quantization process on transform coefficients of all blocks of video data within the determined QG using the determined single QP (408). Video encoder 200 may the entropy encode and output the encoded blocks of video data, e.g., as described above.

In one example of the disclosure, to determine the QG, video encoder 200 is configured to determine that the QG is the same size as the CU splitting node if all of the following conditions are true: an area of the CU splitting node is larger than or equal to the value of the region-based parameter, an area of any child node of the CU splitting node is smaller than the value of the region-based parameter, and the QG has not been specified as any ancestor node of the CU splitting node.

In another example of the disclosure, to determine the QG, video encoder 200 is configured to determine that the QG is the same size as the CU splitting node if all of the following conditions are true: an area of the CU splitting node is larger than or equal to the value of the region-based parameter, the CU splitting node is a leaf node, and the QG has not been specified as any one of the ancestor nodes of the CU splitting nodes.

In another example of the disclosure, to determine the QG, video encoder 200 is configured to determine that the QG is the same size as the CU splitting node if all of the following conditions are true: an area of the CU splitting node is smaller than or equal to the value of the region-based parameter, and an area of a parent node of the CU splitting node is larger than the value of the region-based parameter.

In another example of the disclosure, to determine the QG, video encoder 200 is configured to determine that the QG is the same size as the CU splitting node if all of the following conditions are true: an area of the CU splitting node is larger than the value of the region-based parameter, and the CU splitting node is a leaf node.

In one example of the disclosure, the value of the region-based parameter is 1024.

In another example of the disclosure, video encoder 200 is configured to determine the value of the region-based parameter as MaxDQPRegionPara*MaxDQPRegionPara, wherein information indicating a value of MaxDQPRegionPara is signaled in a picture parameter set (PPS).

In another example of the disclosure, video encoder 200 is configured to determine the value of the region-based parameter as MaxDQPRegionPara1*MaxDQPRegionPara2, wherein information indicating values of MaxDQPRegionPara1 and MaxDQPRegionPara2 are signaled in a picture parameter set (PPS).

In another example of the disclosure, video encoder 200 is configured to determine the value of the region-based parameter as MaxDQPRegionPara wherein information indicating a value of MaxDQPRegionPara is signaled in a picture parameter set (PPS).

In another example of the disclosure, video encoder 200 is configured to determine a quantization parameter predictor for the quantization group, and perform a prediction process on quantization parameter using the determined quantization parameter predictor to determine the single quantization parameter. In one example, the quantization parameter predictor is a slice quantization parameter. In another example, the quantization parameter predictor is an average of a left quantization parameter of a quantization group to the left of the quantization group and an above quantization parameter of a quantization group above the quantization group. In another example, the quantization parameter predictor is one of a left quantization parameter of a quantization group to the left of the quantization group or an above quantization parameter of a quantization group above the quantization group.

In another example of the disclosure, video encoder 200 is configured to initialize a value of a previous quantization parameter predictor (QPPREV) as a slice quantization parameter for a coding tree unit.

Figure 14:
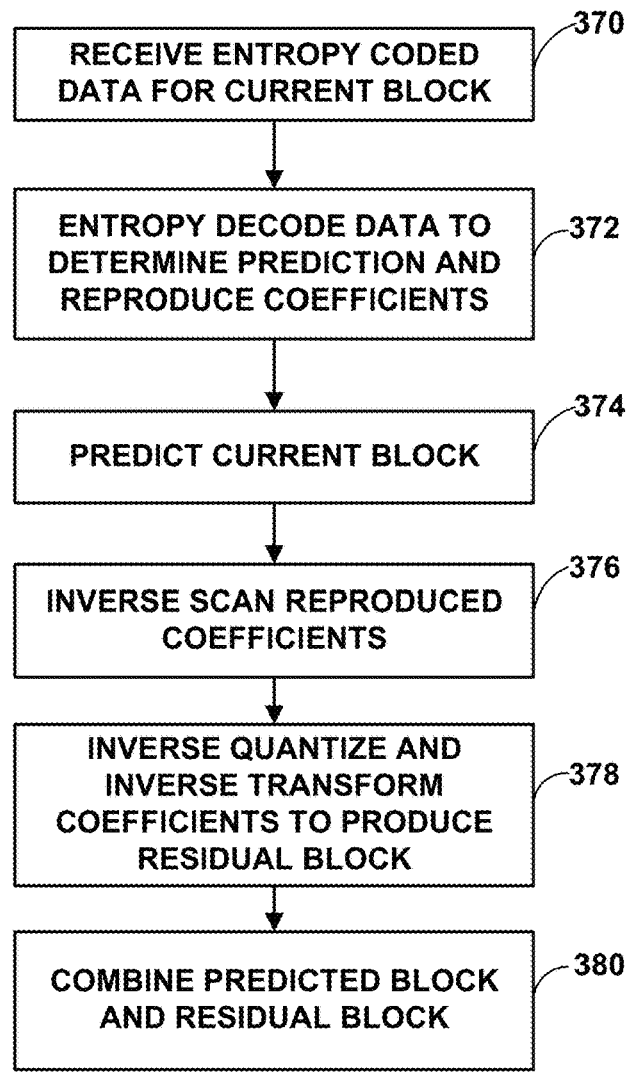
FIG. 14 is a flowchart illustrating an example method for decoding a current block.

FIG. 14 is a flowchart illustrating an example method for decoding a current block of video data. The current block may comprise a current CU. Although described with respect to video decoder 300 (FIGS. 1 and 11), it should be understood that other devices may be configured to perform a method similar to that of FIG. 13.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 15:
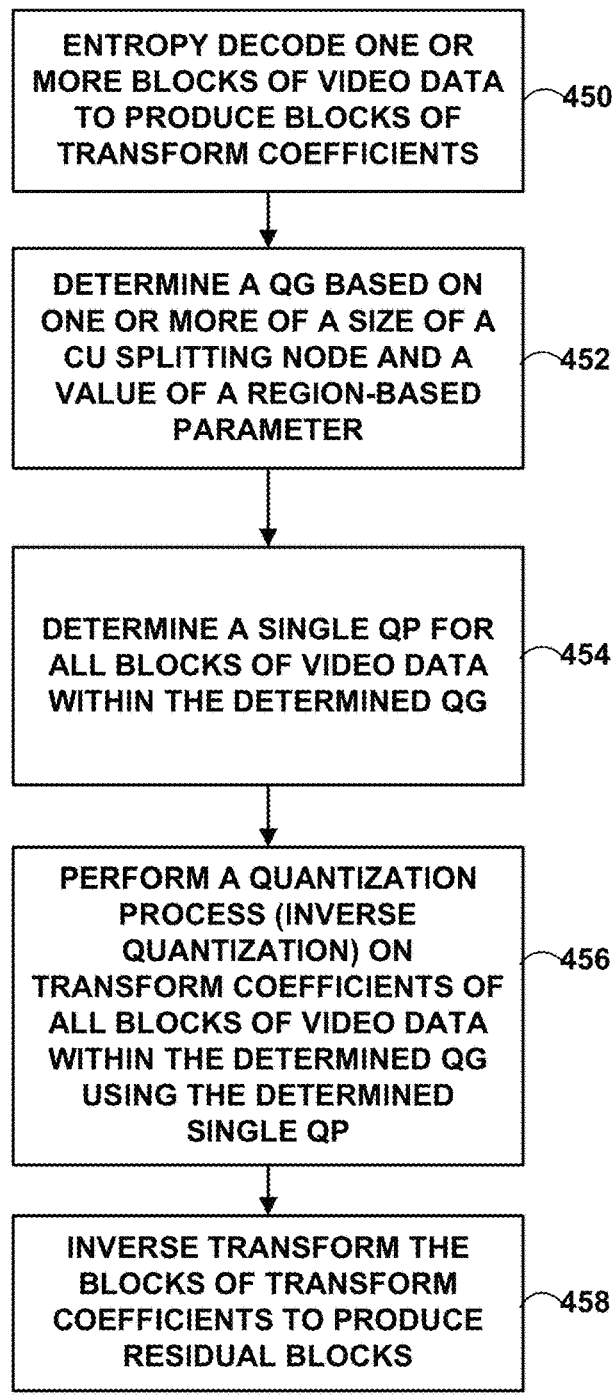
FIG. 15 is a flowchart illustrating an example technique for quantizing a block of video data according to an example decoding technique of the disclosure.

FIG. 15 is a flowchart illustrating an example technique for quantizing a block of video data (e.g., inverse quantize and inverse transform coefficient to produce residual block 378 of FIG. 14) according to an example encoding technique of the disclosure. One or more structural components of video decoder 300 may be configured to perform the techniques of FIG. 14, including inverse quantization unit 306.

In one example of the disclosure, video decoder 300 may be configured to entropy decode one or more blocks of video data to produce blocks of transform coefficients (450). Video decoder 300 may be further configured to determine a QG based on one or more of a size of a CU splitting node and a value of a region-based parameter (452).

Video decoder 300 may further determine a single quantization parameter (QP) for all blocks of video data within the determined QG (454), and perform a quantization process (e.g., inverse quantization) on transform coefficients of all blocks of video data within the determined QG using the determined single QP (456). Video decoder 300 may then inverse transform the blocks of transform coefficients to produce residual blocks (458) Video decoder 300 may then perform a prediction process (e.g., intra prediction, inter prediction, or any other prediction process) to reconstruct the blocks of video data from the residual blocks, e.g., as described above.

In one example of the disclosure, to determine the QG, video decoder 300 is configured to determine that the QG is the same size as the CU splitting node if all of the following conditions are true: an area of the CU splitting node is larger than or equal to the value of the region-based parameter, an area of any child node of the CU splitting node is smaller than the value of the region-based parameter, and the QG has not been specified as any ancestor node of the CU splitting node.

In another example of the disclosure, to determine the QG, video decoder 300 is configured to determine that the QG is the same size as the CU splitting node if all of the following conditions are true: an area of the CU splitting node is larger than or equal to the value of the region-based parameter, the CU splitting node is a leaf node, and the QG has not been specified as any one of the ancestor nodes of the CU splitting nodes.

In another example of the disclosure, to determine the QG, video decoder 300 is configured to determine that the QG is the same size as the CU splitting node if all of the following conditions are true: an area of the CU splitting node is smaller than or equal to the value of the region-based parameter, and an area of a parent node of the CU splitting node is larger than the value of the region-based parameter.

In another example of the disclosure, to determine the QG, video decoder 300 is configured to determine that the QG is the same size as the CU splitting node if all of the following conditions are true: an area of the CU splitting node is larger than the value of the region-based parameter, and the CU splitting node is a leaf node.

In one example of the disclosure, the value of the region-based parameter is 1024.

In another example of the disclosure, video decoder 300 is configured to determine the value of the region-based parameter as MaxDQPRegionPara*MaxDQPRegionPara, wherein information indicating a value of MaxDQPRegionPara is signaled in a picture parameter set (PPS).

In another example of the disclosure, video decoder 300 is configured to determine the value of the region-based parameter as MaxDQPRegionPara1*MaxDQPRegionPara2, wherein information indicating values of MaxDQPRegionPara1 and MaxDQPRegionPara2 are signaled in a picture parameter set (PPS).

In another example of the disclosure, video decoder 300 is configured to determine the value of the region-based parameter as MaxDQPRegionPara wherein information indicating a value of MaxDQPRegionPara is signaled in a picture parameter set (PPS).

In another example of the disclosure, video decoder 300 is configured to determine a quantization parameter predictor for the quantization group, and perform a prediction process on quantization parameter using the determined quantization parameter predictor to determine the single quantization parameter. In one example, the quantization parameter predictor is a slice quantization parameter. In another example, the quantization parameter predictor is an average of a left quantization parameter of a quantization group to the left of the quantization group and an above quantization parameter of a quantization group above the quantization group. In another example, the quantization parameter predictor is one of a left quantization parameter of a quantization group to the left of the quantization group or an above quantization parameter of a quantization group above the quantization group.

In another example of the disclosure, video decoder 300 is configured to initialize a value of a previous quantization parameter predictor (QPPREV) as a slice quantization parameter for a coding tree unit.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining a quantization group (QG) based on one or more of a size of a coding unit (CU) splitting node and a value of a region-based parameter, wherein determining the QG comprises determining that the QG is the same size as the CU splitting node if all of the following conditions are true:
      an area of the CU splitting node is larger than or equal to the value of the region-based parameter;
      an area of any child node of the CU splitting node is smaller than the value of the region-based parameter; and
   the QG has not been specified as any ancestor node of the CU splitting node;
   determining a single quantization parameter for all blocks of video data within the determined quantization group; and
   performing a quantization process on transform coefficients of all blocks of video data within the determined quantization group using the determined single quantization parameter.

2. The method of claim 1, wherein the value of the region-based parameter is 1024.

3. The method of claim 1, further comprising:
   determining the value of the region-based parameter as MaxDQPRegionPara*MaxDQPRegionPara, wherein information indicating a value of MaxDQPRegionPara is signaled in a picture parameter set (PPS).

4. The method of claim 1, further comprising:
   determining the value of the region-based parameter as MaxDQPRegionPara1*MaxDQPRegionPara2, wherein information indicating values of MaxDQPRegionPara1 and MaxDQPRegionPara2 are signaled in a picture parameter set (PPS).

5. The method of claim 1, further comprising:
   determining the value of the region-based parameter as MaxDQPRegionPara wherein information indicating a value of MaxDQPRegionPara is signaled in a picture parameter set (PPS).

6. The method of claim 1, further comprising:
   determining a quantization parameter predictor for the quantization group; and
   performing a prediction process on quantization parameter using the determined quantization parameter predictor to determine the single quantization parameter.

7. The method of claim 6, wherein the quantization parameter predictor is a slice quantization parameter.

8. The method of claim 6, wherein the quantization parameter predictor is an average of a left quantization parameter of a quantization group to the left of the quantization group and an above quantization parameter of a quantization group above the quantization group.

9. The method of claim 6, wherein the quantization parameter predictor is one of a left quantization parameter of a quantization group to the left of the quantization group or an above quantization parameter of a quantization group above the quantization group.

10. The method of claim 6, further comprising:
    initializing a value of a previous quantization parameter predictor (QPPREV) as a slice quantization parameter for a coding tree unit.

11. A method of coding video data, the method comprising:
   determining a quantization group (QG) based on one or more of a size of a coding unit (CU) splitting node and a value of a region-based parameter, wherein determining the QG comprises:
   determining that the QG is the same size as the CU splitting node if all of the following conditions are true:
      an area of the CU splitting node is larger than or equal to the value of the region-based parameter;
      the CU splitting node is a leaf node; and
      the QG has not been specified as any one of an ancestor node of the CU splitting nodes;
   determining a single quantization parameter for all blocks of video data within the determined quantization group; and
   performing a quantization process on transform coefficients of all blocks of video data within the determined quantization group using the determined single quantization parameter.

12. A method of coding video data, the method comprising:
   determining a quantization group (QG) based on one or more of a size of a coding unit (CU) splitting node and a value of a region-based parameter, wherein determining the QG comprises:
   determining that the QG is the same size as the CU splitting node if all of the following conditions are true:
      an area of the CU splitting node is smaller than or equal to the value of the region-based parameter; and
      an area of a parent node of the CU splitting node is larger than the value of the region-based parameter
   determining a single quantization parameter for all blocks of video data within the determined quantization group; and
   performing a quantization process on transform coefficients of all blocks of video data within the determined quantization group using the determined single quantization parameter.

13. A method of coding video data, the method comprising:
   determining a quantization group (QG) based on one or more of a size of a coding unit (CU) splitting node and a value of a region-based parameter, wherein determining the QG comprises:
   determining that the QG is the same size as the CU splitting node if all of the following conditions are true:
      an area of the CU splitting node is larger than the value of the region-based parameter; and
      the CU splitting node is a leaf node
   determining a single quantization parameter for all blocks of video data within the determined quantization group; and
   performing a quantization process on transform coefficients of all blocks of video data within the determined quantization group using the determined single quantization parameter.

14. An apparatus configured to code video data, the apparatus comprising:
   a memory configured to store the video data; and
   one or more processors in communication with the memory, the one or more processors on configured to:
   determine a quantization group (QG) based on one or more of a size of a coding unit (CU) splitting node and a value of a region-based parameter, wherein to determine the QG, the one or more processors are further configured to:
      determine that the QG is the same size as the CU splitting node if all of the following conditions are true:
         an area of the CU splitting node is larger than or equal to the value of the region-based parameter;
         an area of any child node of the CU splitting node is smaller than the value of the region-based parameter; and
         the QG has not been specified as any ancestor node of the CU splitting node;
      determine a single quantization parameter for all blocks of video data within the determined quantization group; and
      perform a quantization process on transform coefficients of all blocks of video data within the determined quantization group using the determined single quantization parameter.

15. The apparatus of claim 14, wherein the value of the region-based parameter is 1024.

16. The apparatus of claim 14, wherein the one or more processors are further configured to:
   determine the value of the region-based parameter as MaxDQPRegionPara*MaxDQPRegionPara, wherein information indicating a value of MaxDQPRegionPara is signaled in a picture parameter set (PPS).

17. The apparatus of claim 14, wherein the one or more processors are further configured to:
   determine the value of the region-based parameter as MaxDQPRegionPara1*MaxDQPRegionPara2, wherein information indicating values of MaxDQPRegionPara1 and MaxDQPRegionPara2 are signaled in a picture parameter set (PPS).

18. The apparatus of claim 14, wherein the one or more processors are further configured to:
   determine the value of the region-based parameter as MaxDQPRegionPara wherein information indicating a value of MaxDQPRegionPara is signaled in a picture parameter set (PPS).

19. The apparatus of claim 14, wherein the one or more processors are further configured to:
   determine a quantization parameter predictor for the quantization group; and
   perform a prediction process on quantization parameter using the determined quantization parameter predictor to determine the single quantization parameter.

20. The apparatus of claim 19, wherein the quantization parameter predictor is a slice quantization parameter.

21. The apparatus of claim 19, wherein the quantization parameter predictor is an average of a left quantization parameter of a quantization group to the left of the quantization group and an above quantization parameter of a quantization group above the quantization group.

22. The apparatus of claim 19, wherein the quantization parameter predictor is one of a left quantization parameter of a quantization group to the left of the quantization group or an above quantization parameter of a quantization group above the quantization group.

23. The apparatus of claim 19, wherein the one or more processors are further configured to:
   initialize a value of a previous quantization parameter predictor (QPPREV) as a slice quantization parameter for a coding tree unit.

24. An apparatus configured to code video data, the apparatus comprising:
   a memory configured to store the video data; and
   one or more processors in communication with the memory, the one or more processors on configured to:

determine a quantization group (QG) based on one or more of a size of a coding unit (CU) splitting node and a value of a region-based parameter, wherein to determine the QG, the one or more processors are further configured to:

determine that the QG is the same size as the CU splitting node if all of the following conditions are true:
an area of the CU splitting node is larger than or equal to the value of the region-based parameter;
the CU splitting node is a leaf node; and
the QG has not been specified as any one of an ancestor node of the CU splitting nodes;

determine a single quantization parameter for all blocks of video data within the determined quantization group; and perform a quantization process on transform coefficients of all blocks of video data within the determined quantization group using the determined single quantization parameter.

25. An apparatus configured to code video data, the apparatus comprising:
a memory configured to store the video data; and
one or more processors in communication with the memory, the one or more processors on configured to:
determine a quantization group (QG) based on one or more of a size of a coding unit (CU) splitting node and a value of a region-based parameter, wherein to determine the QG, the one or more processors are further configured to:
determine that the QG is the same size as the CU splitting node if all of the following conditions are true:
an area of the CU splitting node is smaller than or equal to the value of the region-based parameter; and
an area of a parent node of the CU splitting node is larger than the value of the region-based parameter;
determine a single quantization parameter for all blocks of video data within the determined quantization group; and
perform a quantization process on transform coefficients of all blocks of video data within the determined quantization group using the determined single quantization parameter.

26. An apparatus configured to code video data, the apparatus comprising:
a memory configured to store the video data; and
one or more processors in communication with the memory, the one or more processors on configured to:
determine a quantization group (QG) based on one or more of a size of a coding unit (CU) splitting node and a value of a region-based parameter, wherein to determine the QG, the one or more processors are further configured to:
determine that the QG is the same size as the CU splitting node if all of the following conditions are true:
an area of the CU splitting node is larger than the value of the region-based parameter; and
the CU splitting node is a leaf node;
determine a single quantization parameter for all blocks of video data within the determined quantization group; and
perform a quantization process on transform coefficients of all blocks of video data within the determined quantization group using the determined single quantization parameter.

27. An apparatus configured to code video data, the apparatus comprising:
means for determining a quantization group (QG) based on one or more of a size of a coding unit (CU) splitting node and a value of a region-based parameter, wherein determining the QG comprises determining that the QG is the same size as the CU splitting node if all of the following conditions are true:
an area of the CU splitting node is larger than or equal to the value of the region-based parameter;
an area of any child node of the CU splitting node is smaller than the value of the region-based parameter; and
the QG has not been specified as any ancestor node of the CU splitting node;
means for determining a single quantization parameter for all blocks of video data within the determined quantization group; and
means for performing a quantization process on transform coefficients of all blocks of video data within the determined quantization group using the determined single quantization parameter.

28. A non-transitory computer-readable storage medium storing instructions that, when executed, causes one or more processors configured to code video data to: determine a quantization group (QG) based on one or more of a size of a coding unit (CU) splitting node and a value of a region-based parameter, wherein to determine the QG, the one or more processors are further configured to:
determine that the QG is the same size as the CU splitting node if all of the following conditions are true:
an area of the CU splitting node is larger than or equal to the value of the region-based parameter;
an area of any child node of the CU splitting node is smaller than the value of the region-based parameter; and
the QG has not been specified as any ancestor node of the CU splitting node;
determine a single quantization parameter for all blocks of video data within the determined quantization group; and
perform a quantization process on transform coefficients of all blocks of video data within the determined quantization group using the determined single quantization parameter.

* * * * *